(12) United States Patent
Craig et al.

(10) Patent No.: US 7,159,890 B2
(45) Date of Patent: Jan. 9, 2007

(54) TRAILER HITCH FOR A MOTOR VEHICLE

(75) Inventors: Scott C. Craig, Livonia, MI (US);
Joachim Spratte, Osnabrück (DE)

(73) Assignee: ZF Lemförder Metallwaren AG (DE)

( * ) Notice: Subject to any disclaimer, the term of this patent is extended or adjusted under 35 U.S.C. 154(b) by 132 days.

(21) Appl. No.: 10/959,726

(22) Filed: Oct. 6, 2004

(65) Prior Publication Data
US 2006/0071448 A1   Apr. 6, 2006

(51) Int. Cl.
*B60D 1/06* (2006.01)
*B62D 53/00* (2006.01)

(52) U.S. Cl. .................. 280/511; 280/492; 280/446.1; 280/432

(58) Field of Classification Search .............. 280/511, 280/492, 446.1, 432
See application file for complete search history.

(56) References Cited

U.S. PATENT DOCUMENTS

| | | | | |
|---|---|---|---|---|
| 3,947,839 A | * | 3/1976 | Zigmant | 340/431 |
| 4,988,116 A | * | 1/1991 | Evertsen | 280/477 |
| 5,861,814 A | * | 1/1999 | Clayton | 340/687 |
| 5,951,035 A | * | 9/1999 | Phillips et al. | 280/477 |
| 6,053,521 A | * | 4/2000 | Schertler | 280/511 |
| 6,806,809 B1 | * | 10/2004 | Lee et al. | 340/431 |
| 6,879,240 B1 | * | 4/2005 | Kruse | 338/12 |
| 6,956,468 B1 | * | 10/2005 | Lee et al. | 340/431 |
| 7,017,701 B1 | * | 3/2006 | Flynn et al. | 180/282 |

FOREIGN PATENT DOCUMENTS

| | | |
|---|---|---|
| DE | 198 34 752 | 7/1999 |
| DE | 198 10 378 | 9/1999 |

* cited by examiner

*Primary Examiner*—Lesley D. Morris
*Assistant Examiner*—Marc A. Scharich
(74) *Attorney, Agent, or Firm*—McGlew & Tuttle, PC

(57) ABSTRACT

A trailer hitch for a motor vehicle includes a towbar (2) having an arm (1) and a ball cup (3) provided with an opening and with a ball pivot (6). The ball pivot (6) has a ball head (4) and a pivot (5) and is mounted with the ball head (4) rotatably and pivotably in the ball cup (3) and passes through an opening (7) and juts out of the ball cup (3). An angle-measuring device having a signal transmitter (17) and two sensors (40, 41) is arranged in the joint unit formed from the ball cup (3) and the ball head (4).

23 Claims, 5 Drawing Sheets

TRAILER HITCH FOR A MOTOR VEHICLE

FIELD OF THE INVENTION

The present invention pertains to a trailer hitch for a motor vehicle, with a towbar having an arm and a ball cup provided with an opening and with a ball head and a ball pivot having a pin, which said ball pivot is mounted rotatably and pivotably with the ball head in the ball cup and passes through the opening and juts out of the ball cup.

BACKGROUND OF THE INVENTION

Towing systems with passenger cars usually comprise a towing passenger car and a trailer, which usually has a body arranged on an axle and is coupled with the towing passenger car via a towbar and a trailer hitch. The trailer hitch is standardized in Europe and comprises a ball head on the motor vehicle side and a ball cup on the trailer side. Many drivers have difficulties during switching in estimating the position of the trailer and in deflecting the system comprising the towed and towing vehicles in the desired direction.

In case of unfavorable loading, defects at the trailer axle and side wind effects, it may happen that the trailer destabilizes the system comprising the towing and towed vehicles due to rolling movements and uncontrolled driving states are provoked.

DE 198 10 378 A1 discloses a trailer hitch with a hitch ball, which is carried by a ball neck and in which a ball opening is provided. An inductive, metal-detecting sensor is held at an insert, which is fixed in the ball opening and has a mount for the sensor. The trailer hitch may consist of a deformable steel, a deformable light metal or even a castable metal, whereas the insert is preferably made of a plastic part. The sensor is designed to detect the coupled or uncoupled state of a hitch mouth. The angle of the hitch mouth relative to the trailer hitch cannot be determined with this arrangement.

DE 198 34 752 C2 pertains to a device for controlling the reverse travel of motor vehicles with trailers, wherein the determination of the relative position of the motor vehicle in relation to the trailer is performed by an eccentric distance measurement by ultrasound at two points. As an alternative, the position of the motor vehicle in relation to the trailer can be determined by an angle measurement in the trailer hitch. However, it is not disclosed how and with what means the angle measurement can be carried out in the trailer hitch. Furthermore, rolling movements of the trailer in relation to the motor vehicle cannot be detected.

SUMMARY OF THE INVENTION

Based on this state of the art, the basic object of the present invention is to provide a trailer hitch with which the torsion angle and the roll angle between a motor vehicle and a trailer coupled therewith via the trailer hitch can be determined.

According to the invention, a trailer hitch for a motor vehicle is provided with a towbar having an arm and a ball cup provided with an opening. A ball pivot is provided having a ball head and a pin. The ball pivot is mounted with the ball head rotatably and pivotably in the ball cup and passes through the opening and juts out of the ball cup. An angle-measuring device having a signal transmitter and two said sensors is arranged in the joint unit formed from the ball cup and the ball head.

Due to the fact that the angle-measuring device of the trailer hitch according to the present invention has a signal transmitter and two sensors, it is possible to measure both the torsion angle and the roll angle of a trailer relative to a motor vehicle. The torsion angle is defined here as the angle that is formed between the longitudinal axis of the motor vehicle and the longitudinal axis of the trailer. The roll angle is the angle that is formed between the vertical axis of the motor vehicle and the vertical axis of the trailer, wherein the longitudinal axis of the motor vehicle and the vertical axis of the motor vehicle as well as the longitudinal axis of the trailer and the vertical axis of the trailer form a right angle each with one another. Since the two vertical axes are regularly located at spaced locations from one another, the roll angle is considered to be the angle that is formed between the projections of the two vertical axes into a plane extending at right angles to the longitudinal axis of the motor vehicle.

The two sensors may be provided at different locations on a spherical surface that is concentric with the ball head. Furthermore, the two sensors may form right angles with one another and arranged, e.g., crosswise or directed in an L-shaped pattern in relation to one another, the sensitive surfaces of the two sensors preferably extending at right angles to one another, so that the determination of two angles arranged at right angles to one another, e.g., the torsion angle and the roll angle, is simplified.

The sensors may be arranged in the ball head and the signal transmitter in the ball cup. However, the sensors are preferably arranged in the ball cup and the signal transmitter in the ball head.

It is possible to arrange the two sensors separately from one another. However, the two sensors are preferably integrated into one sensor assembly unit, as a result of which the assembly effort for the sensors can be reduced. The sensor assembly unit may be located on a straight line, which forms right angles with the longitudinal axis of the arm and extends, in particular, through the center of the ball head. Furthermore, the sensors or the sensor assembly unit may be seated in a recess provided in the wall of the ball cup.

The arm has, in particular, two legs, which are connected with one another, are located at spaced locations from one another and between which a locking mechanism is located, by means of which the ball cup can be secured against separation from the ball head. The two legs are preferably connected with one another via a back, so that the arm has an essentially U-shaped cross section, which imparts high stability on the arm as a whole.

As is common in trailer hitches, the ball pivot may have a curved shape and be fastened to the motor vehicle with its end facing away from the ball head.

Angle-measuring devices based on magnetic field measurements have proved to be particularly immune to disturbance, so that the signal transmitter may be designed as a magnet and the sensors as magnetic field-sensitive sensors, e.g., Hall sensors. However, the magnetic field-sensitive sensors are preferably designed as magnetoresistive sensors, which make possible, unlike Hall sensors, a two-point measurement per sensor, so that the wiring effort can be reduced.

The magnet may be seated in a recess of the ball head and embedded in a nonmagnetic material, so that the ball head can be manufactured from a ferromagnetic material.

Furthermore, the present invention pertains to a towing system with a motor vehicle, a trailer and a trailer hitch according to the present invention, which may be varied according to all the above-mentioned embodiments. The pivot pin is fastened to the motor vehicle at a spaced location from the ball head, whereas the arm or the towbar is fixed at the trailer at least indirectly at a spaced location from the ball cup. The towbar may be fastened to a wheel axle of the trailer or at the trailer body, the towbar having, in particular, a fork, which is arranged between the arm and the trailer and via which the towbar or the arm is fixed to the trailer.

Vehicles regularly have a vertical axis and a longitudinal axis extending at right angles thereto, which intersects the vertical axis, which is also true of the motor vehicle and the trailer. The sensors are integrated, in particular, into a sensor assembly unit, which lies on a straight line, which extends at right angles to the vertical axis of the trailer and at right angles to the longitudinal axis of the trailer. Furthermore, the signal transmitter may be located on a straight line, which extends at right angles to the vertical axis of the motor vehicle and at right angles to the longitudinal axis of the motor vehicle. If the signal transmitter is designed as a magnet, the magnetization of this magnet extends, in particular, at right angles to the vertical axis of the motor vehicle and at right angles to the longitudinal axis of the motor vehicle.

The straight line on which the signal transmitter is located or along which its magnetization extends when this is a magnet preferably extends through the center of the ball. The straight line on which the sensor assembly unit is located preferably also extends through the center of the ball or through the center of the spherical mounting surface of the ball cup. The two straight lines can thus coincide at a torsion angle of 0° and a roll angle of 0°. Furthermore, the longitudinal axis of the arm may extend in parallel to the longitudinal axis of the trailer and be, in particular, identical to same.

The present invention also pertains to a use of the trailer hitch according to the present invention for a towing system comprising a motor vehicle and a trailer, wherein the trailer is connected with the motor vehicle via the trailer hitch, and a roll angle and a torsion angle of the trailer in relation to the motor vehicle are determined by means of the angle-measuring device, wherein the roll angle is located in a first plane, which forms right angles with a second plane, in which the torsion angle is located. The trailer hitch and the towing system may be varied according to all the above-mentioned embodiments.

The present invention will be described below on the basis of a preferred embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
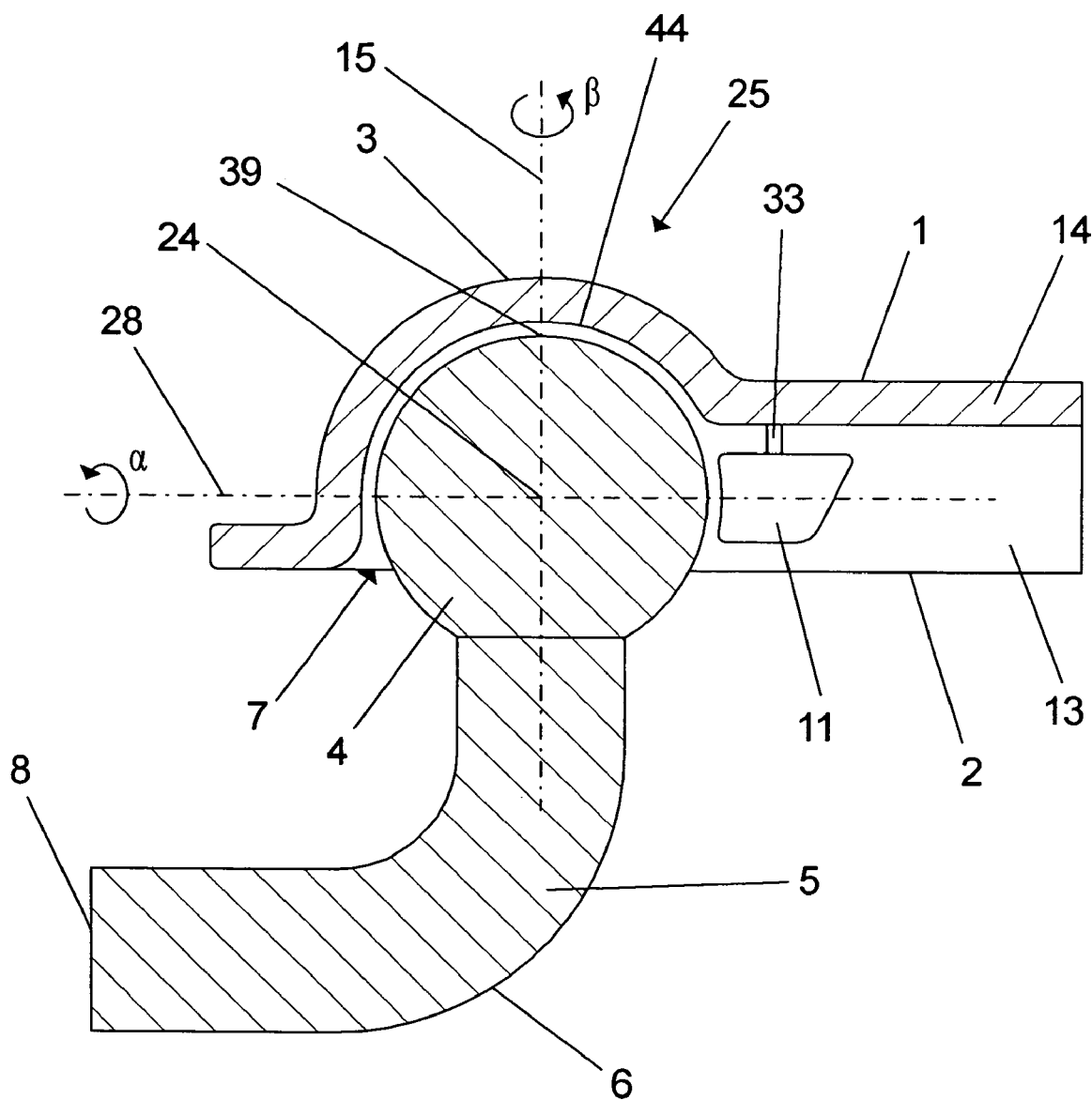
FIG. 1 is a lateral sectional view of an embodiment of the trailer hitch according to the present invention.

Referring to the drawings in particular, FIG. 1 shows a lateral sectional view of an embodiment of the trailer hitch 25 according to the present invention, in which a ball cup 3, which has an opening 7 as well as a spherical mounting surface 44 and is made in one piece with the arm 1, is arranged at the end of an arm 1 of a towbar 2. A ball pivot 6, which has a ball head 4 and a pin 5 made in one piece therewith, is seated in the ball cup 3, the ball pivot 6 being mounted with its ball head 4 rotatably and pivotably in the ball cup 3 and passing through the opening 7 and jutting out of the ball cup 3. The end 8 of the ball pivot 6 facing away from the ball head 4 is fastened to a motor vehicle 9 (see FIG. 4), whereas the end of the towbar 2 facing away from the ball cup 3 is fixed to a trailer 10 (see FIG. 4).

A detachable locking mechanism 11, by means of which the ball cup 3 can be secured against separation from the ball head 4, is fastened to the arm 1 via a holder 33 at a spaced location from the ball 4.

Figure 2:
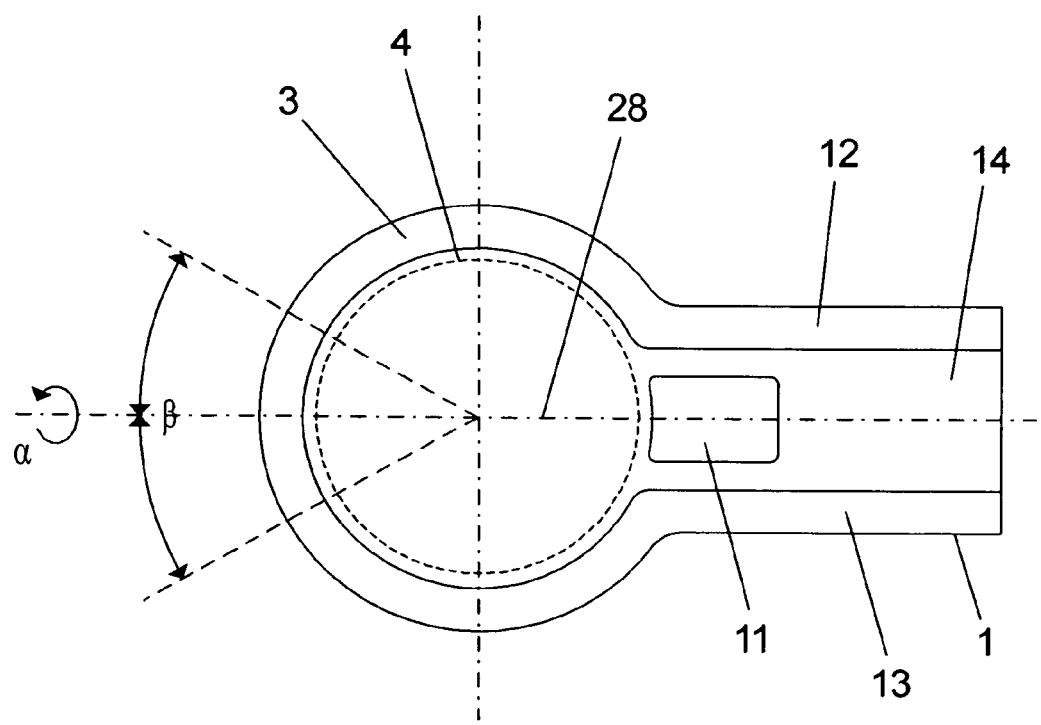
FIG. 2 is a bottom view of the embodiment according to FIG. 1 with the ball pivot omitted.

FIG. 2 shows a bottom view of the embodiment, wherein the ball pivot 6 was omitted. Only the contour of the ball head 4 is indicated by broken line. The arm 1 has two legs 12 and 13, between which the locking mechanism 11 is seated, wherein the two arms 12 and 13 are connected with one another via a back 14, so that the arm 1 has a cross section in the form of a U-shaped section.

A relative rotation of the ball cup 3 in relation to the ball pivot 6 around the vertical axis 15 of the trailer hitch 25, which said vertical axis is visible in FIG. 1, is characterized by the torsion angle β, whereas a relative movement of the ball cup 3 in relation to the ball pivot 6 around the longitudinal axis 28 of the motor vehicle 9 (or of the undeflected trailer hitch), which said longitudinal axis is visible in FIG. 1, is characterized by the roll angle α. The vertical axis 15 of the trailer hitch 25 now extends through the center 24 and the vertex 39 of the ball head 4.

Figure 3:
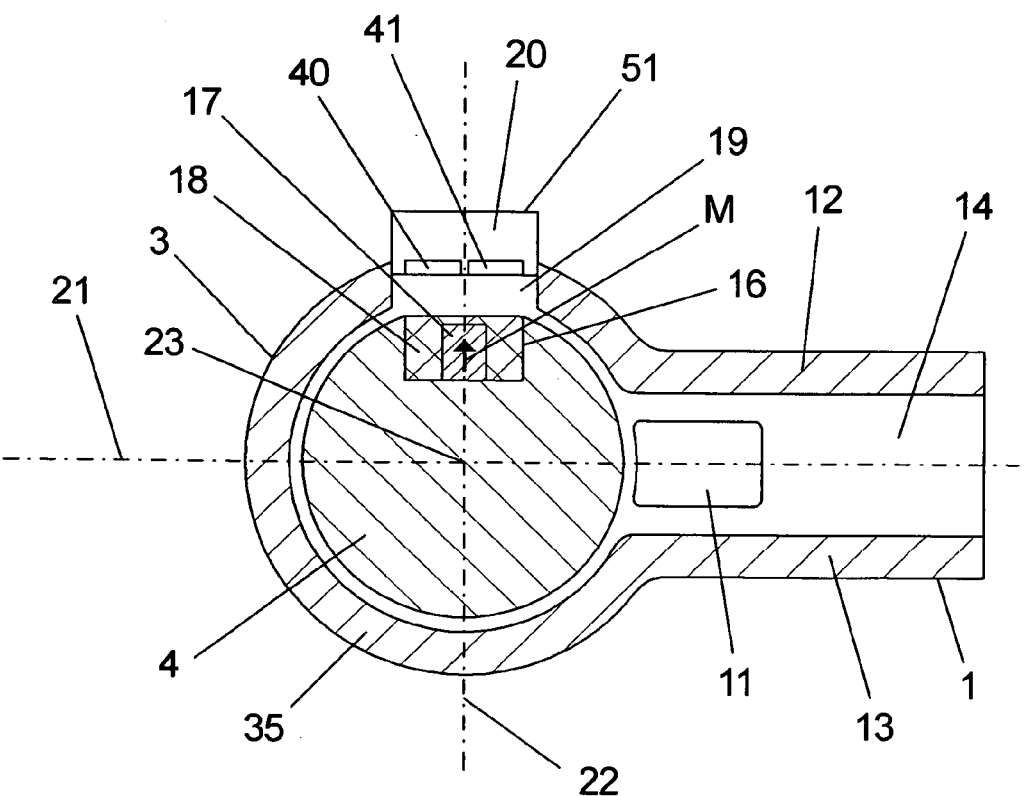
FIG. 3 is a cut-away bottom view of the embodiment according to FIG. 1.

FIG. 3 shows a cut-away bottom view of the embodiment, wherein a permanent magnet 17, which is embedded in a nonmagnetic material 18 and acts as a signal transmitter, is seated in a recess 16 provided in the ball head 4. A sensor assembly unit 20, which is provided with a housing 51 and has two magnetoresistive sensors 40 and 41 directed at right angles to one another (see FIG. 8) and is located on a straight line 22, is arranged in a recess 19 in the wall 35 of the ball cup 3. The straight line 22 extends at right angles to the longitudinal axis 21 of the arm 1 and intersects same at the point 23, which coincides with the center 24 of the ball head 4 and of the spherical mounting surface 44 according to this embodiment. Furthermore, the plane defined by the two straight lines 21 and 22 extends in parallel to the back 14 of the arm 1, the magnet 17 now being directed such that it is located opposite the sensor assembly unit 20 on the straight line 22 in the undeflected state of the trailer hitch. The magnetization M of the magnet 17 is likewise located on the straight line 22 in the undeflected state. According to this embodiment, the longitudinal axis 21 of the arm 1 coincides with the longitudinal axis 27 of the trailer 10.

Figure 4:
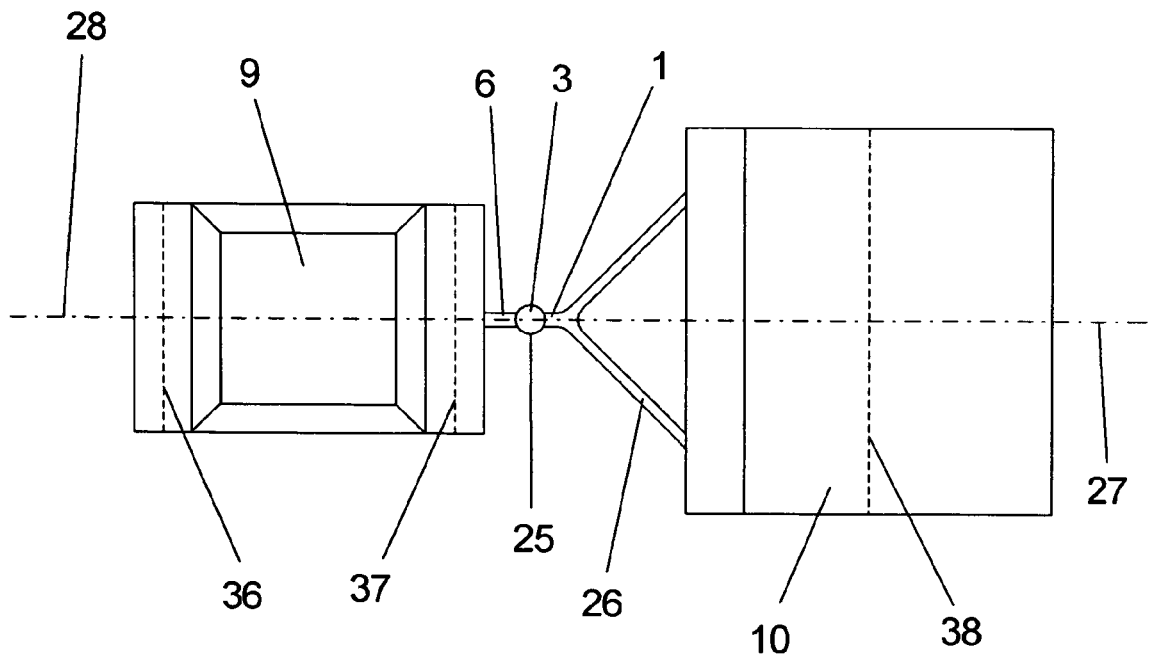
FIG. 4 is a top view of a towing system with a trailer hitch according to the embodiment with a torsion angle of 0°.

FIG. 4 shows a top view of a towing system having the motor vehicle 9 and the trailer 10, wherein the trailer 10 is coupled with the motor vehicle 9 via the trailer hitch 25 according to the embodiment. A fork 26, which extends from the arm 1 to the trailer 10 and is fastened there, is fastened to the arm 1 of the trailer hitch 25 or is made in one piece with the arm 1. According to FIG. 4, the trailer 10 is not twisted in relation to the motor vehicle 9, so that the torsion angle equals β=0° and the longitudinal axis 27 of the trailer 10 coincides with the longitudinal axis 28 of the motor vehicle 9 or extends in parallel to same. In contrast, the trailer 10 is twisted in relation to the motor vehicle 9 around the vertical axis 15 of the trailer hitch 25 according to FIG. 5, so that the longitudinal axis 27 of the trailer 10 forms a torsion angle β>0° with the longitudinal axis 28 of the motor vehicle 9.

Figure 5:
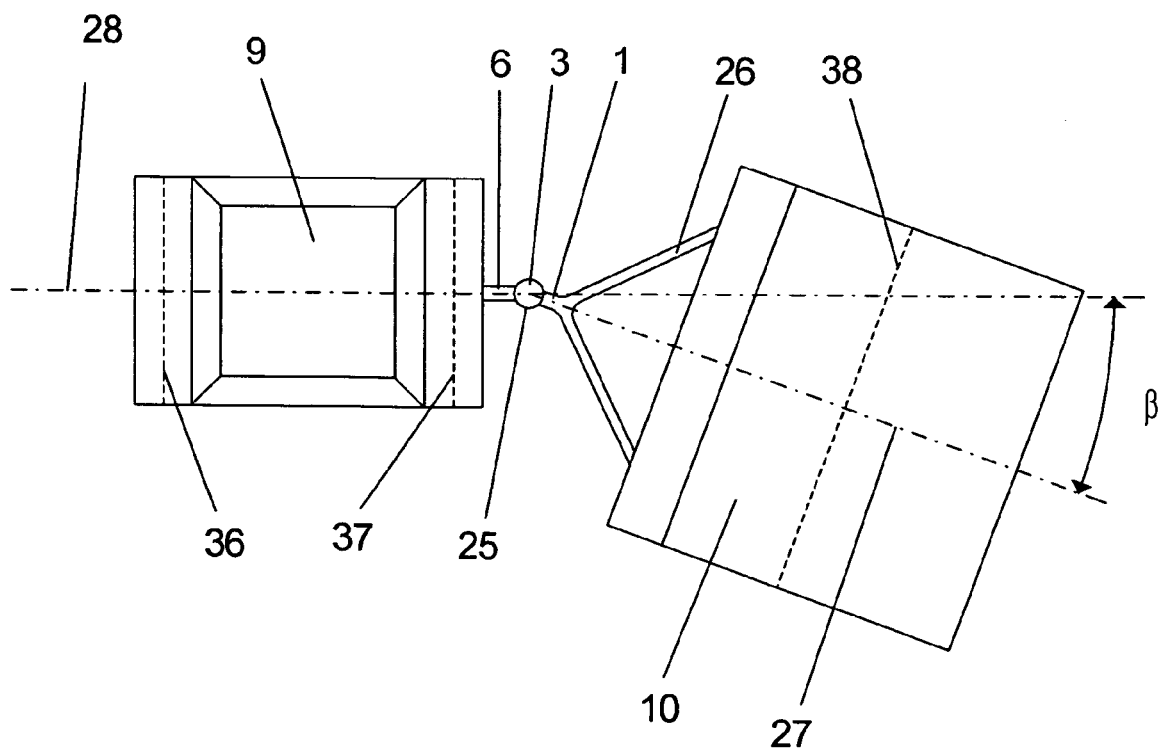
FIG. 5 is a top view of the towing system according to FIG. 4 at a torsion angle of β>0°.

The wheel axles of the motor vehicle 9 and the wheel axle of the single-axle trailer 10 are indicated by broken lines in FIGS. 4 and 5, wherein the front wheel axis of the motor vehicle 9 is designated by the reference number 36, the rear wheel axle of the motor vehicle 9 by the reference number 37, and the wheel axle of the trailer 10 by the reference number 38.

Figure 6:
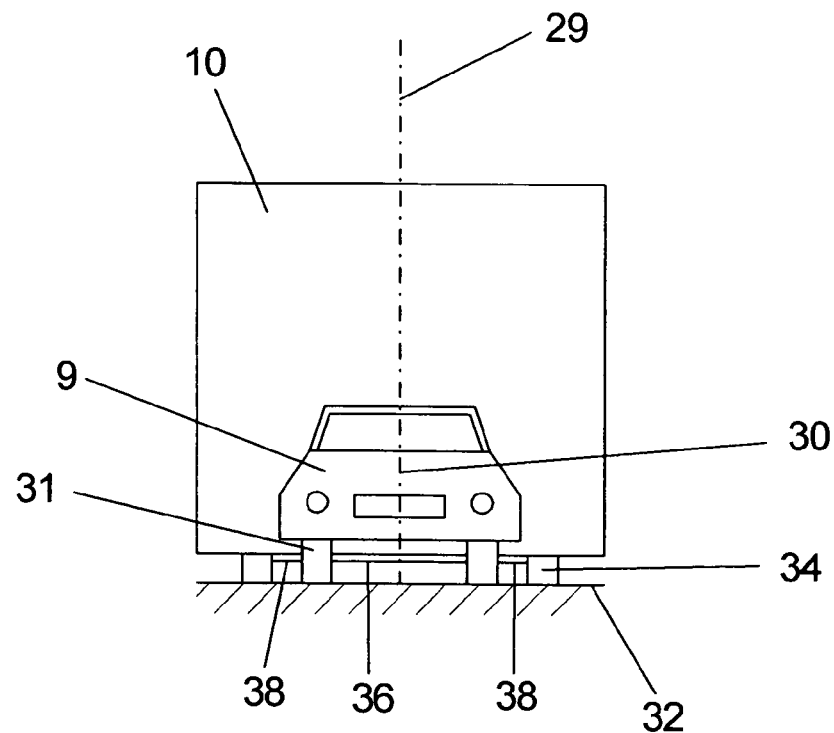
FIG. 6 is a front view of the towing system at a roll angle of 0°.
Figure 7:
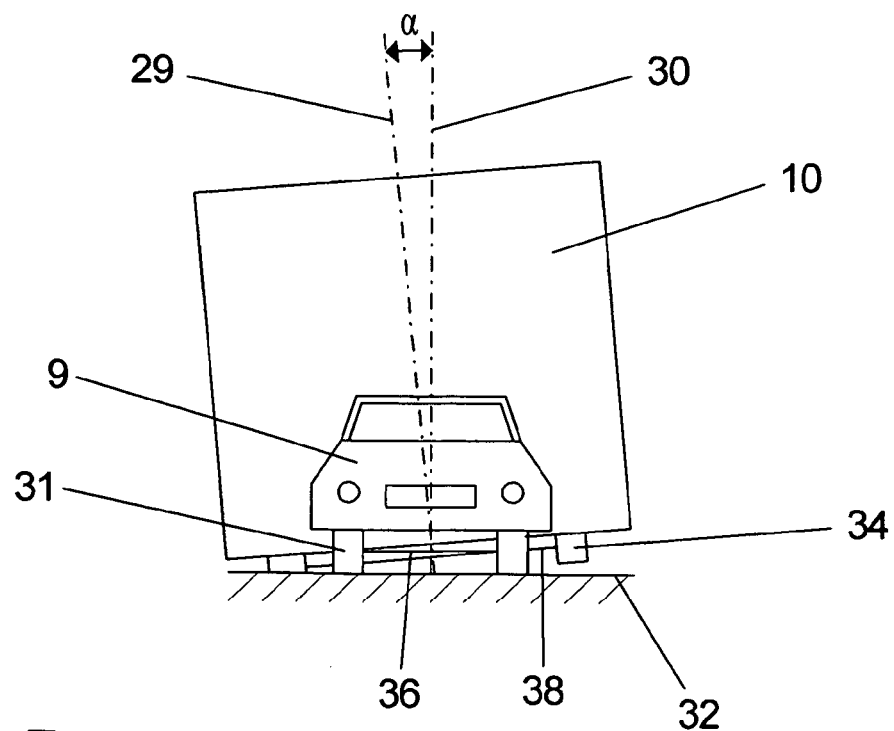
FIG. 7 is a front view of the towing system at a roll angle of α>0°.

FIG. 6 shows a front view of the towing system, wherein the roll angle α between the vertical axis 29 of the trailer 10 and the vertical axis 30 of the motor vehicle equals 0°, so that the vertical axis 29 of the trailer 10 extends in parallel to the vertical axis 30 of the motor vehicle 9. In contrast to this, FIG. 7 shows a front view of the towing system, in which the vertical axis 29 of the trailer 10 forms a roll angle of α>0° with the vertical axis 30 of the motor vehicle 9. Since the two vertical axes 29 and 30 are located at spaced locations from one another, the two vertical axes 29 and 30 shown in FIG. 7 are the projections of these respective axes into a plane that forms right angles with the longitudinal axis 28 of the motor vehicle 9.

Torsion by the torsion angle β takes place around the vertical axis 15 of the trailer hitch 25, whereas a rolling movement by the roll angle α takes place around the longitudinal axis 28 of the motor vehicle. The vertical axis 15 of the trailer hitch 25 now extends in parallel to the vertical axis 30 of the motor vehicle and intersects the longitudinal axis 28 of the motor vehicle at the center 24 of the ball head 4. FIG. 6 also shows, furthermore, that the motor vehicle 9 with its wheels 31 and the trailer 10 with its wheels 34 are in contact with a pavement 32. In this case, i.e., at a roll angle of α=0°, the arm 1 or the back 14 of the arm 1 is directed in parallel to the pavement 32.

The two sensors 40 and 41 as well as the permanent magnet 17 together form an angle-measuring device, wherein the sensors 40 and 41 are connected via electric lines 42 (see FIG. 8) to an evaluating means 43 (see FIG. 8), which evaluates the signals sent by the sensors 40 and 41 and is preferably arranged in the motor vehicle 9. Since these signals change as a function of the distance between the sensors 40 and 41, on the one hand, and the magnet 17, on the other hand, the evaluating means 43 can determine the torsion angle β and the roll angle α.

Figure 8:
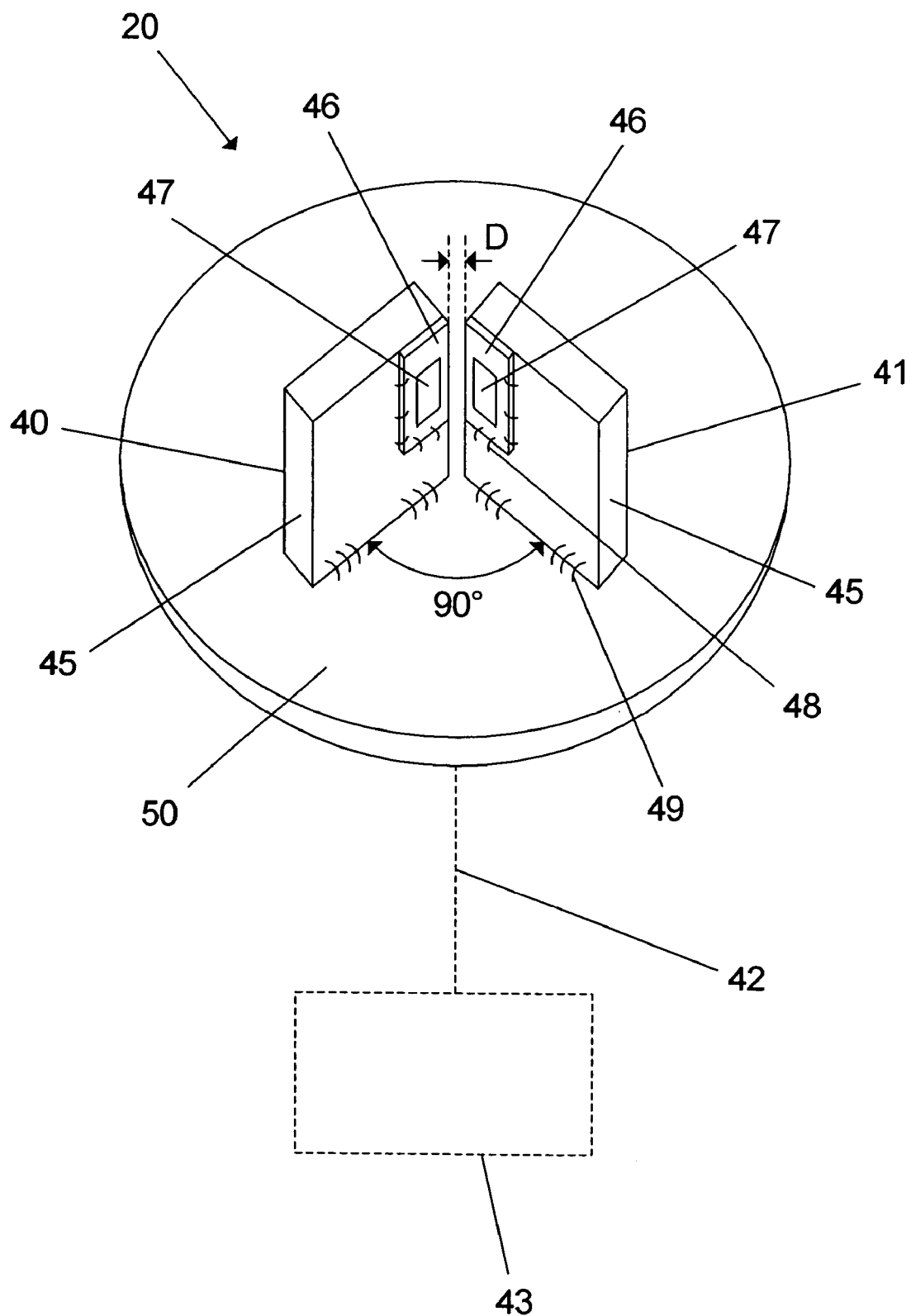
FIG. 8 is a schematic view of the sensor assembly unit according to FIG. 3.

FIG. 8 shows a schematic view of the sensor assembly unit 20, wherein the two sensors 40 and 41 have a sensor carrier 45 and a sensor element 46 each with a sensitive surface 47. The two sensor carriers 45 are located at a distance D from one another, which preferably equals 0.3 mm, and form an angle of 90° with one another. However, it is also possible to reduce the distance to zero. Furthermore, the sensitive surfaces 47 of the sensor elements 46 form right angles with one another or, in other words, the two sensitive surfaces 47 are located in planes that form right angles with one another.

The sensor elements 46 are connected via electric contacts (bonds) 48 with the respective sensor carrier 45, which is connected via electric contacts 49 to a printed circuit board 50, on which the two sensor carriers 45 are seated.

Furthermore, the electric lines 42, which extend from the sensor assembly unit 20 to the evaluating means 43, are connected to the printed circuit board 50.

While specific embodiments of the invention have been shown and described in detail to illustrate the application of the principles of the invention, it will be understood that the invention may be embodied otherwise without departing from such principles.

APPENDIX

List of Reference Numbers

1 Arm of towbar
2 Towbar
3 Ball cup of towbar
4 Ball head of ball pivot
5 Pin of ball pivot
6 Ball pivot
7 Opening of ball cup
8 End of ball pivot
9 Motor vehicle
10 Trailer
11 Locking mechanism
12 Leg of arm
13 Leg of arm
14 Back of arm
15 Vertical axis of trailer hitch
16 Recess in ball head
17 Permanent magnet
18 Nonmagnetic material
19 Recess in wall of ball cup
20 Sensor assembly unit
21 Longitudinal axis of arm
22 Straight line through sensors
23 Intersection of the straight lines through the sensors with the longitudinal axis of the arm
24 Center of ball head
25 Trailer hitch
26 Fork
27 Longitudinal axis of trailer
28 Longitudinal axis of motor vehicle
29 Vertical axis of trailer
30 Vertical axis of motor vehicle
31 Wheels of motor vehicle
32 Pavement
33 Locking mechanism holder
34 Wheels of trailer
35 Wall of ball cup
36 Front wheel axle of motor vehicle
37 Rear wheel axle of motor vehicle
38 Wheel axle of trailer
39 Vertex of ball head
40 Sensor
41 Sensor
42 Electric lines
43 Evaluating means
44 Spherical mounting surface of ball cup
45 Sensor carrier
46 Sensor element
47 Sensitive surface

48 Contact (bond)
49 Contact
50 Printed circuit board
51 Housing of sensor array
α Roll angle
β Torsion angle
M Magnetization of the permanent magnet
D Distance between the sensor carriers

What is claimed is:

1. A trailer hitch for a motor vehicle, the trailer hitch comprising:
    a towbar having an arm and a ball cup provided with an opening;
    a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said angle-measuring device measuring a torsion angle and a roll angle between said tow bar and said ball pivot.

2. A trailer hitch in accordance with claim 1, wherein said signal transmitter comprises a magnet and said sensors are magnetic field-sensitive sensors.

3. A trailer hitch in accordance with claim 2, wherein said sensors are magnetoresistive sensors.

4. A trailer hitch in accordance with claim 3, wherein said sensors each have a sensitive surface, wherein the two sensitive surfaces are arranged at right angles to one another.

5. A trailer hitch in accordance with claim 2, wherein said sensors each have a sensitive surface, wherein the two sensitive surfaces are arranged at right angles to one another.

6. A trailer hitch in accordance with claim 1, wherein said two sensors are directed at right angles in relation to one another.

7. A trailer hitch in accordance with claim 1, wherein said two sensors are integrated into a sensor assembly unit.

8. A trailer hitch in accordance with claim 1, wherein said ball pivot is curved.

9. A towing system, comprising:
    a motor vehicle;
    a trailer;
    a trailer hitch with a towbar having an arm and a ball cup provided with an opening and a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said pivot pin being fixed at the motor vehicle at a spaced location from the ball head, and said towbar being fastened to the trailer at a spaced location from said ball cup, said angle-measuring device measuring a torsion angle and a roll angle between said tow bar and said ball pivot.

10. A trailer hitch process, comprising the steps of:
    providing a motor vehicle;
    providing a trailer;
    providing a trailer hitch with a towbar having an arm and a ball cup provided with an opening and a ball pivot having a ball head and a pin, said ball pivot being mounted rotatably and pivotably with said ball head in said ball cup and passing through said opening and jutting out of said ball cup;
    providing an angle-measuring device having a signal transmitter and two sensors, said angle measuring device being arranged in a joint unit comprising said ball cup and said ball head;
    connecting the trailer with the motor vehicle via the trailer hitch;
    determining a roll angle and a torsion angle of the trailer in relation to the motor vehicle by means of the angle-measuring device, wherein the roll angle is located in a first plane, which forms right angles with a second plane, in which the torsion angle is located.

11. A trailer hitch for a motor vehicle, the trailer hitch comprising:
    a towbar having an arm and a ball cup provided with an opening;
    a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said signal transmitter being arranged in said ball head and said sensors being arranged in said ball cup.

12. A trailer hitch for a motor vehicle, the trailer hitch comprising:
    a towbar having an arm and a ball cup provided with an opening;
    a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said two sensors being integrated into a sensor assembly unit located on a straight line, which forms right angles with the longitudinal axis of said arm and extends through a center of said ball head.

13. A trailer hitch for a motor vehicle, the trailer hitch comprising:
    a towbar having an arm and a ball cup provided with an opening;
    a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said two sensors being seated in a recess provided in a wall of said ball cup.

14. A trailer hitch for a motor vehicle, the trailer hitch comprising:
    a towbar having an arm and a ball cup provided with an opening;
    a ball pivot having a ball head and a pin, said ball pivot being mounted rotatably and pivotably with said ball head in said ball cup and passing through said opening and jutting out of said ball cup;
    an angle-measuring device having a signal transmitter and two sensors, said angle measuring device being arranged in a joint unit comprising said ball cup and said ball head, said signal transmitter comprising a magnet and said sensors being magnetic field-sensitive sensors, said magnet being embedded in a nonmagnetic material and being seated in a recess provided in the ball head.

15. A towing system, comprising:
a motor vehicle having a motor vehicle vertical axis and a motor vehicle longitudinal axis extending at right angles thereto;
a trailer;
a trailer hitch with a towbar having an arm and a ball cup provided with an opening and a ball pivot having a ball head and a pin, said ball pivot being mounted rotatably and pivotably with said ball head in said ball cup and passing through said opening and jutting out of said ball cup;
an angle-measuring device having a signal transmitter and two sensors, said angle measuring device being arranged in a joint unit comprising said ball cup and said ball head, said
pivot pin being fixed at the motor vehicle at a spaced location from the ball head, and said towbar being fastened to the trailer at a spaced location from said ball cup, said signal transmitter being located on a straight line that extends at right angles to said motor vehicle vertical axis and at right angles to said motor vehicle longitudinal axis.

16. A towing system in accordance with claim 15, wherein:
said trailer has a trailer vertical axis and a trailer longitudinal axis extending at right angles thereto;
said two sensors are integrated into a sensor assembly unit located on a straight line and extending at right angles to the trailer vertical axis and at right angles to the trailer longitudinal axis.

17. A towing system in accordance with claim 16, wherein the straight line, on which the sensor assembly unit is located, and the straight line, on which the signal transmitter is located, extend through the center of the ball head.

18. A towing system in accordance with claim 16, wherein said signal transmitter is a magnet, having a magnetization extending at right angles to the motor vehicle vertical axis and at right angles to the motor vehicle longitudinal axis.

19. A towing system, comprising:
a motor vehicle;
a trailer;
a trailer hitch with a towbar having an arm and a ball cup provided with an opening and a ball pivot having a ball head and a pin, said ball pivot being mounted rotatably and pivotably with said ball head in said ball cup and passing through said opening and jutting out of said ball cup;
an angle-measuring device having a signal transmitter and two sensors, said angle measuring device being arranged in a joint unit comprising said ball cup and said ball head, said
pivot pin being fixed at the motor vehicle at a spaced location from the ball head, and said towbar being fastened to the trailer at a spaced location from said ball cup, said signal transmitter being arranged in said ball head and said sensors being arranged in said ball cup.

20. A trailer hitch arrangement comprising:
a towbar having an arm connectable to a trailer and a ball cup;
a ball pivot having a ball head and a pin, said ball head being mountable rotatably and pivotably in said ball cup;
an angle-measuring device on said towbar and ball pivot, said angle-measuring device including a signal transmitter and two sensors, said angle-measuring device measuring a torsion angle and a roll angle between said tow bar and said ball pivot.

21. An arrangement in accordance with claim 20, wherein:
said torsion angle lies in a torsion plane and said roll angle lies in a roll plane, said torsion plane and said roll plane being arranged substantially perpendicular to each other.

22. An arrangement in accordance with claim 20, wherein:
said tow bar has a longitudinal axis, said roll angle-measuring device measuring an angle between said tow bar and said ball pivot which is around said longitudinal axis of said tow bar.

23. An arrangement in accordance with claim 20, further comprising: a trailer connected to said tow bar, said trailer having a longitudinal axis substantially parallel to said longitudinal axis of said tow bar; a tow vehicle connected to said ball pivot, said tow vehicle and said ball pivot having a longitudinal axis, said torsion angle being an angle between said longitudinal axis of said tow bar and said longitudinal axis of said ball pivot.

* * * * *